(12) United States Patent
Yu et al.

(10) Patent No.: US 12,406,423 B2
(45) Date of Patent: Sep. 2, 2025

(54) AVATAR CONTROL

(71) Applicant: Fujitsu Limited, Kawasaki (JP)

(72) Inventors: Heng Yu, Pittsburgh, PA (US);
Koichiro Niinuma, Pittsburgh, PA (US); Laszlo Jeni, Pittsburgh, PA (US)

(73) Assignees: Fujitsu Limited, Kawasaki (JP); CARNEGIE MELLON UNIVERSITY, Pittsburgh, PA (US)

( * ) Notice: Subject to any disclaimer, the term of this patent is extended or adjusted under 35 U.S.C. 154(b) by 197 days.

(21) Appl. No.: 18/192,607

(22) Filed: Mar. 29, 2023

(65) Prior Publication Data
US 2024/0161376 A1    May 16, 2024

Related U.S. Application Data (60) Provisional application No. 63/383,472, filed on Nov. 11, 2022.

(51) Int. Cl.
*G06T 13/40* (2011.01)
*G06T 17/00* (2006.01)
*G06V 40/16* (2022.01)

(52) U.S. Cl.
CPC .............. *G06T 13/40* (2013.01); *G06T 17/00* (2013.01); *G06V 40/168* (2022.01)

(58) Field of Classification Search
CPC ............................ G06T 13/40; G06V 40/168
See application file for complete search history.

(56) References Cited

U.S. PATENT DOCUMENTS

| | | | |
|---|---|---|---|
| 2011/0150090 A1* | 6/2011 | Hugosson | H04N 19/61 375/E7.243 |
| 2018/0165546 A1* | 6/2018 | Skans | G06N 3/045 |
| 2019/0213399 A1* | 7/2019 | Yoo | G06V 40/171 |
| 2019/0294868 A1* | 9/2019 | Martinez | G06V 40/171 |
| 2021/0216756 A1* | 7/2021 | Uchida | G06V 40/171 |
| 2022/0245776 A1* | 8/2022 | Vaezi Joze | G06T 5/50 |

OTHER PUBLICATIONS

Kania et al., "CoNeRF: Controllable Neural Radiance Fields" Dec. 3, 2021.
Cao et al., "Authentic Volumetric Avatars From a Phone Scan" Jul. 2022.

* cited by examiner

*Primary Examiner* — Yi Yang
(74) *Attorney, Agent, or Firm* — Maschoff Brennan (57) ABSTRACT

In an example, a method may include obtaining, from a data source, first data including multiple frames each including a human face. The method may include automatically detecting, in each of the multiple frames, one or more facial landmarks and one or more action units (AUs) associated with the human face. The method may also include automatically generating one or more semantic masks based at least on the one or more facial landmarks, the one or more semantic masks individually corresponding to the human face. The method may further include obtaining a facial hyperspace using at least the first data, the one or more AUs, and the semantic masks. The method may also include generating a synthetic image of the human face using a first frame of the multiple frames and one or more AU intensities individually associated with the one or more AUs.

20 Claims, 6 Drawing Sheets

AVATAR CONTROL

CROSS-REFERENCE TO RELATED APPLICATIONS

This application claims the benefit of U.S. Provisional Patent Application No. 63/383,472, filed on Nov. 11, 2022, and titled "AVATAR CONTROL METHOD," the disclosure of which is incorporated herein by reference in its entirety.

FIELD

The embodiments discussed in the present disclosure are related to avatar control.

BACKGROUND

Machine vision continues to make progress in functionality and accuracy, including with respect to making determinations about 3D objects using 2D observations. Some representations of synthesized 3D objects from a neural network may be dynamic, such that the synthesized 3D objects may display changes in time. In some circumstances, control of the 3D objects may introduce complexities that may be in addition to rendering a synthesized 3D object. Alternatively, or additionally, manipulation of the synthesized 3D object may be limited to motions between related aspects of the synthesized 3D object, such that independent control of the synthesized 3D object may be unavailable.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include obtaining, from a data source, first data including multiple frames each including a human face. The method may also include automatically detecting, in each of the multiple frames, one or more facial landmarks and one or more action units (AUs) associated with the human face. The method may further include automatically generating one or more semantic masks based at least on the one or more facial landmarks, the one or more semantic masks individually corresponding to the human face. The method may also include obtaining a facial hyperspace using at least the first data, the one or more AUs, and the semantic masks. The method may further include generating a synthetic image of the human face using a first frame of the multiple frames and one or more AU intensities individually associated with the one or more AUs.

The object and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Machine vision and/or representation of objects using machine vision has made significant progress in recent years. For example, three dimensional (3D) objects and/or scenes (referred to collectively as "objects" unless explicitly referred to otherwise) may be modeled and/or represented through a machine vision system observing and interpreting two dimensional (2D) images of the object. In some circumstances, machine vision systems implement one or more machine learning systems to observe objects in 2D and generate 3D representations thereof. Many 3D representations of 2D objects may be based on static objects such that the 3D representation is also static. Improvements have been introduced to increase the functionality and/or computing time of machine vision systems relative to the static objects, but machine vision handling of dynamic objects may include additional computational complexity relative to static objects.

In some circumstances, a neural radiance field (NeRF) may be used to generate novel views of 3D scenes, based in part on at least a 2D view of the scene. Additionally, variations to the NeRF approach may expand the operation and/or functionality of a machine learning system to generate 3D views. In some circumstances, NeRF and/or variations thereof may be used to generate 3D scenes that may include a human face and/or associated expressions. The novel views, including a synthesized human face and/or the associated expressions, may be based on images captured and/or input into the NeRF network.

In some prior approaches, multiple cameras may be used to capture the 3D scene (e.g., including the human face and associated expressions) such that generating a novel view of the 3D scene may use multiple video inputs to potentially improve the quality of the rendering of the novel view at an increased expense due to the multiple cameras and/or the quality of the cameras (e.g., high resolution, multi-view, etc.). In another approach, novel views may be generated using annotations to the data that may be performed by an operator or user of the data. The annotations may guide the machine learning network to identify portions of the 3D scene to be used in generating the novel view. Such annotations may come at the expense of a significant amount of time by the annotator as many images may be included in the 3D scene that may be used as an input into the machine learning network.

In at least one embodiment of the present disclosure, a method for determining, displaying, and/or controlling a representation of a 3D object (e.g., an avatar) using a 2D representation thereof may include obtaining data associated with a 3D scene, including a human face having various expressions in the course of the data. In some embodiments, the data may be obtained from a single data source, which may include a video recording device that may be readily available to many users. Facial landmarks and/or action units (AUs) associated with the human face may be automatically detected such that no annotation may be used in the data prior to processing by a neural network architecture. Alternatively, or additionally, semantic masks associated with the human face may be automatically generated using the facial landmarks and/or the AUs may be assigned to the semantic masks which may provide unique and/or specific control of various expressions and/or portions of the human face.

In some embodiments, a facial hyperspace may be built and a synthetic image of the human face (e.g., an avatar) may be generated and displayed, where the avatar may include modifiable expressions that may be similar to and/or unique from the human face and the associated expressions captured in the data. Automatically detecting facial landmarks and AUs, and subsequently automatically generating semantic masks may improve processing time of the avatar as the manual annotation may be time consuming. Alternatively, or additionally, the combination of the AUs and the semantic masks may enable detailed control over expressions produced in the avatar while limiting efforts in obtaining the data and/or annotating the data used to generate the avatar.

Embodiments of the present disclosure will be explained with reference to the accompanying drawings.

Figure 1:
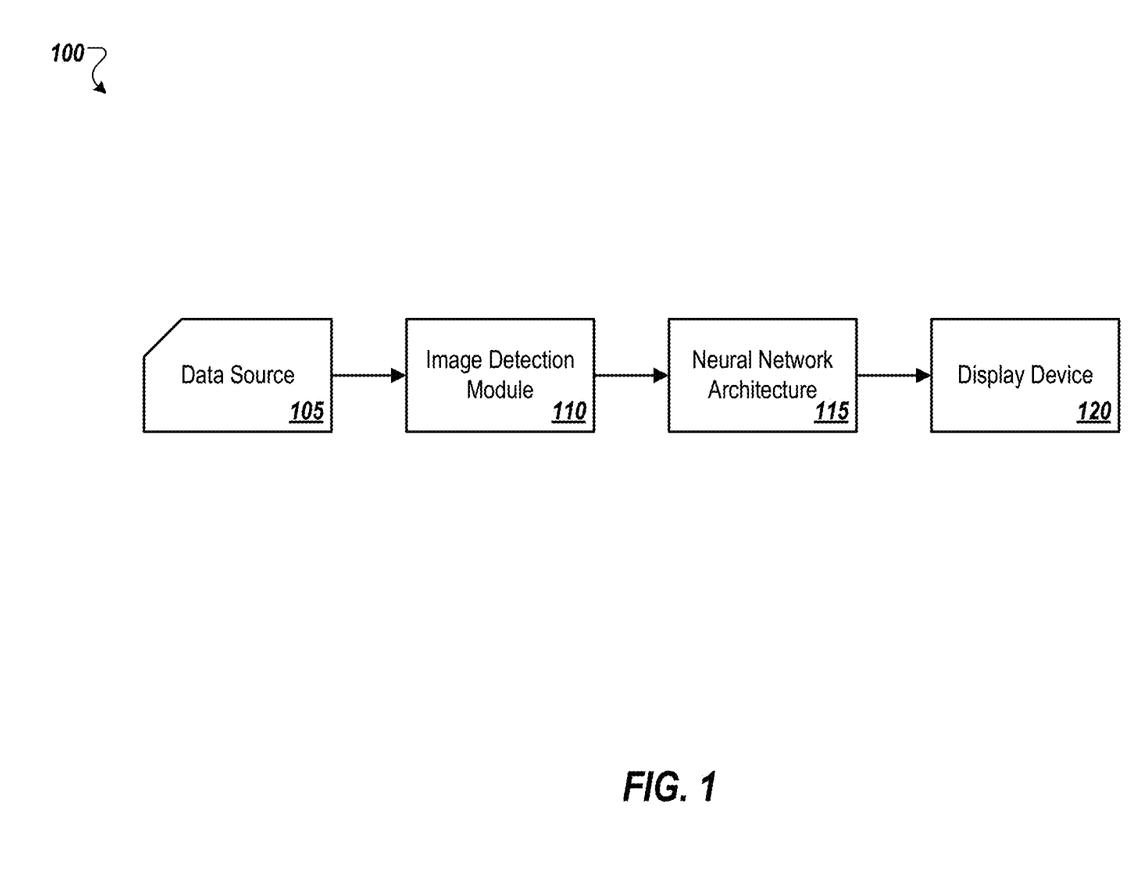
FIG. 1 is a block diagram of an example environment configured to support avatar control.

FIG. 1 is a block diagram of an example environment 100 configured to support avatar control, in accordance with at least one embodiment of the present disclosure. The environment 100 may include an image detection module 110, a neural network architecture 115, and a display device 120.

In some embodiments, the image detection module 110 may obtain first data from a data source 105. The first data from the data source 105 may include one or more images, a video stream, and/or other representations of a scene that may include multiple video frames (hereinafter, "frame" or "frames" for short) taken of the scene. For example, the first data may include a digital video recording (e.g., multiple frames per second) that captures a scene and/or objects within the scene, including various movements of the objects within the scene. Alternatively, or additionally, the first data may include a human face (e.g., an object included in the scene) included in the multiple frames, where one or more facial expressions associated with the human face may be captured in the multiple frames. For example, the first data may include a digital video recording of a human face, where the expression of the human face may vary between different facial expressions, such as smiling, frowning, grimacing, and/or other facial expressions. In some embodiments, these facial expressions may be according to one or more tasks that the person is requested to perform while capturing their face in a video (e.g., "raise your eyebrows," "smile," "frown," etc.).

In some embodiments, the image detection module 110 may include code and routines configured to allow one or more computing devices to perform one or more operations. Additionally, or alternatively, the image detection module 110 may be implemented using hardware including one or more processors, central processing units (CPUs), graphics processing units (GPUs), data processing units (DPUs), parallel processing units (PPUs), microprocessors (e.g., to perform or control performance of one or more operations), field-programmable gate arrays (FPGA), application-specific integrated circuits (ASICs), accelerators (e.g., deep learning accelerators), and/or other processor types. In some other instances, the image detection module 110 may be implemented using a combination of hardware and software.

In the present disclosure, operations described as being performed using the image detection module 110 may include operations that the image detection module 110 may direct a corresponding system to perform.

In some embodiments, the data source 105 may include a handheld recording device configured to obtain a digital video recording. For example, the data source 105 may include a mobile phone (e.g., a smart phone) that may be capable of recording digital videos. In some embodiments, the data source 105 may be configured to obtain a slow-motion digital video. For example, the data source 105 may capture the first data at a first number of frames per second and the playback of the first data may be at a second number of frames per second, such that the first data may be in slow motion. Alternatively, or additionally, the first data may include one or more inserted frames such that the first data may be captured at a first number of frames per second and the playback of the first data may be at the first number of frames per second, and the inserted frames may cause the first data to playback in slow motion.

In some embodiments, the data source 105 may be configured to adjust a data source location, such as relative to the scene and/or relative to the object within the scene. For example, in instances in which the data source 105 is a handheld recording device (e.g., a smart phone) recording a human face, the location of the handheld recording device (e.g., the data source 105) may be adjusted relative to the human face while continuing to capture the first data associated with the human face in the scene. In these or other embodiments, the location of the data source 105 may vary in the alternative or in addition to variations to the scene (e.g., including variations to objects within the scene, such as a human face and associated changes in facial expression). For example, the data source 105 may include slow-motion digital video of a human face changing facial expressions in addition to the location of the data source 105 varying relative to the human face.

In some embodiments, the image detection module 110 may obtain the first data generated using the data source 105 and may be configured to detect one or more features associated with the first data. For example, the image detection module 110 may be configured to detect variations in the scene and/or the objects within the scene. In instances in which an object in a scene is a human face, the image detection module 110 may be configured to detect facial landmarks associated with the human face. Alternatively, or additionally, the image detection module 110 may be configured to detect AUs associated with the human face. Facial landmarks may refer to various portions of a human face and/or identifiable features of a human face, that may be detected using the image detection module 110. For example, facial landmarks may include, but not be limited to, eyebrows, inner/outer corners of the eye, nostrils, lips, vermillion border, and/or other identifiable portions of a human face. AUs may refer to moveable portions of the human face, that may be associated with facial expressions, underlying muscles of the human face, the facial landmarks, and/or changes relative to any of the foregoing. For example, a first AU may be an outer eyebrow raiser, a second AU may be a cheek raiser, a third AU may be a lip corner puller, and so forth. In some embodiments, the AUs detected using the image detection module 110 may be categorized using a code to identify individual AUs. For example, an inner eyebrow raiser may be AU1, an outer eyebrow raiser may be AU2, an eyebrow lowerer may be AU4, and so forth. In some embodiments, the codes associated with the AUs may be in accordance with the facial action coding system, which may be a taxonomy of human facial movements based on appearance on a human face.

In some embodiments, the AUs may include an associated AU intensity, which may describe how much the AU is applied for a given human face. For example, in instances in which an outer eyebrow is raised as much as possible (e.g., for a given human face), the associated AU (e.g., the outer eyebrow raiser) may be a maximum intensity value. In some embodiments, the AU intensity may be a scale from a minimum intensity value to a maximum intensity value. The AU intensity may be predetermined values, such as a minimum intensity value (e.g., a neutral expression relative to the facial muscles associated with the AU), a first increment, a second increment, and so forth, up to a maximum intensity value (e.g., as much as the human face can express the facial expression, and/or as much as the related facial muscles may contract and/or relax). In some embodiments, such values may be from zero (neutral expression/absence of the AU) up to five (the maximum intensity). Alternatively, or additionally, the AU intensity may be a continuum between the minimum intensity value and the maximum intensity value, as described above. In some embodiments, the image detection module 110 may determine a minimum intensity value and/or a maximum intensity value of the individual AU intensities based on the detected AU intensity in the frames of the first data from the data source 105. For example, a first AU may be detected relative to a human face in one or more frames of the first data and based on a minimum intensity value and a maximum intensity value of the first AU as detected in the one or more frames, the minimum intensity value and the maximum intensity value associated with the AU may be determined. In these or other embodiments, the image detection module 110 may be configured to obtain one or more AUs associated with a human face, an AU intensity associated with individual AUs, and/or one or more AU blocks, where an individual AU block may be a combination of an AU and an associated AU intensity.

In some embodiments, the neural network architecture 115 may obtain one or more of the outputs from the image detection module 110, including at least the facial landmarks, the AUs, the AU intensities individually associated with the AUs, and/or the AU blocks. In some embodiments, the neural network architecture 115 may be configured to apply a filter to at least the AUs detected in the multiple frames of the first data, such that noise that may have been introduced relative to the AUs in adjacent frames of the multiple frames may be reduced. For example, a Savitzky-Golay filter may be applied by the neural network architecture 115, which may smooth the AUs between adjacent frames of the multiple frames of the first data.

In some embodiments, processing the multiple frames included in the first data using the neural network architecture 115 may be computational complex and/or time intensive. Processing the multiple frames may include various functions performed using the neural network architecture 115 relative to the first data, which may include, but are not limited to, filtering the AUs, determining one or more semantic masks associated with the facial landmarks, determining a facial hyperspace, generating a synthetic image, and/or other processing functions, all as described in the present disclosure.

In some embodiments, the neural network architecture 115 may be configured to sample a portion of the multiple frames included in the first data, such that the neural network architecture 115 may perform processing on a portion of the multiple frames. In some embodiments, the sampled frames may reduce the computational complexity and/or the amount of time to process the sampled frames by the neural network architecture 115 as the number of sampled frames may be less than the number of the multiple frames included in the first data.

In some embodiments, the sampled frames may be obtained from uniform sampling of the multiple frames using the neural network architecture 115. For example, the neural network architecture 115 may sample one frame out of a predetermined number of frames and repeat the sampling process until the sampled frames are obtained. Alternatively, or additionally, the neural network architecture 115 may be configured to obtain the sampled frames from balanced sampling of the multiple frames. For example, the neural network architecture 115 may perform a sorting operation based on the AU blocks (e.g., the combination of an AU and an associated AU intensity), arrange the sorted AU blocks based on an order of the multiple frames (e.g., a frame number associated with a frame, a time stamp associated with a frame, etc.), and the neural network architecture 115 may sample one or more frames from the sorted and arranged AU blocks. Alternatively, or additionally, the neural network architecture 115 may be configured to remove one or more frames of the multiple frames that may have already been sampled. For example, in instances in which a frame is included in more than one sorted AU block (e.g., the frame includes variations to more than AU) and sampled from a first sorted AU block, the sampled frame may be removed from subsequent AU blocks such that the sampled frame may not be sampled a second time. In some embodiments, the balanced sampling of the multiple frames may result in a reduced computational complexity and/or reduced amount of time to process the sampled frames using the neural network architecture 115 and a more uniform AU intensity distribution among the sampled frames relative to a uniform sampling of the multiple frames.

In some embodiments, the neural network architecture 115 may be configured to generate one or more semantic masks associated with the first data and/or the human face included in the first data. In some embodiments, the semantic masks may be generated automatically be the neural network architecture 115. For example, in response to receiving the output from the image detection module 110 including at least the facial landmarks, the neural network architecture 115 may automatically generate one or more semantic masks based on at least the facial landmarks. In some embodiments, the semantic masks may be associated with the human face included in the first data and/or the facial landmarks detected using the image detection module 110.

Figure 4:
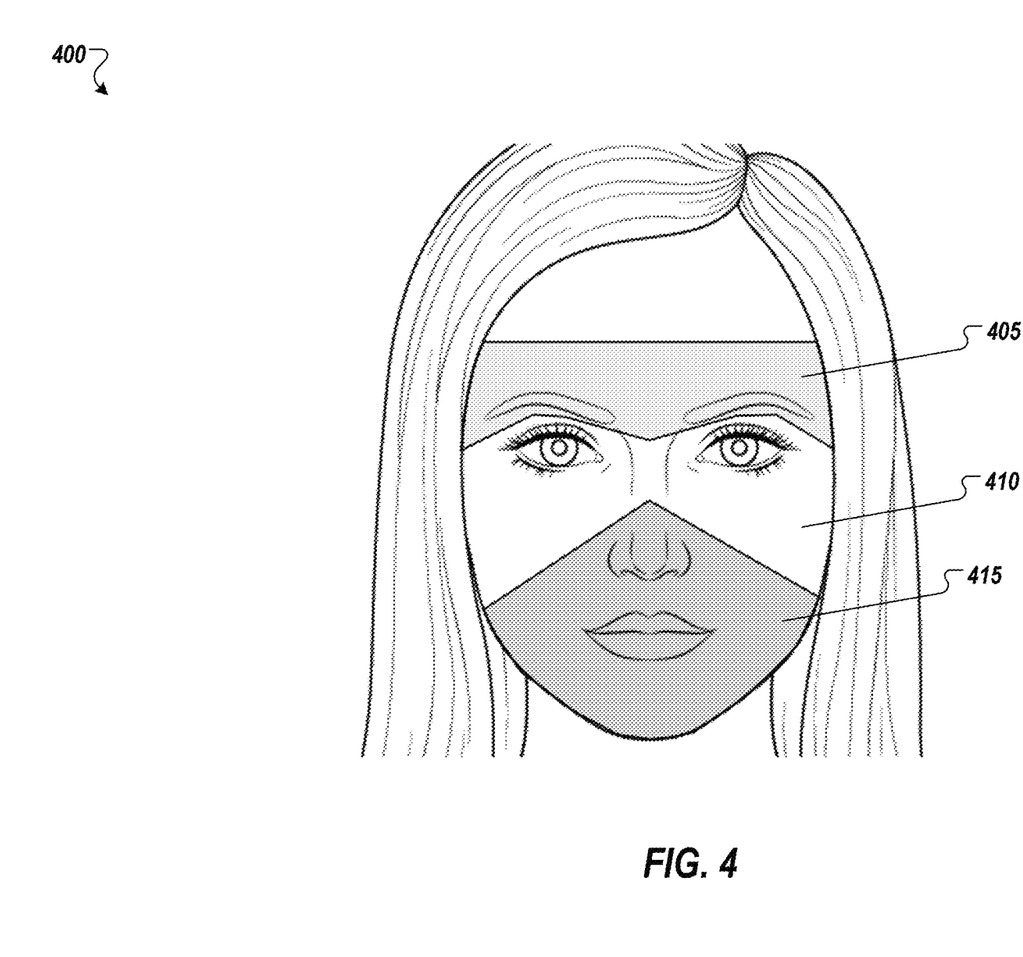
FIG. 4 illustrates an example environment including multiple masks applied to a human face.

In some embodiments, the semantic masks may be automatically generated based on one or more predetermined facial landmarks. For example, the facial landmarks may be categorized using a code (e.g., similar to the AUs, as described herein) and sets of the facial landmarks may be grouped together to form a semantic mask. In some embodiments, the number of semantic masks may be predetermined, such as using a predetermined grouping of the facial landmarks. For example, in an embodiment that includes three semantic masks, a first semantic mask may include portions of a human face above a bottom part of the eyebrows and above a bridge portion of a nose, a second semantic mask may include the eyes, cheeks/cheekbones, and the bridge of the nose, and the third semantic mask may include a bottom portion of the nose, a mouth, and a chin. For example, FIG. 4 illustrates example masks applied to a human face according to the example provided herein.

Alternatively, or additionally, the number of semantic masks that may be applied to a human face may be configurable in the neural network architecture 115, such as by identifying various facial landmarks to be included in the semantic mask. In these or other embodiments, the semantic masks may define a boundary relative to a portion of the human face, where the boundary may include a separation between semantic masks when more than one semantic mask is present.

In these or other embodiments, the AUs may be automatically assigned to the generated semantic masks based on the location of the AUs relative to the human face and/or the semantic masks (e.g., in instances in which an AU is within a boundary associated with a first semantic mask, the AU may be assigned to the first semantic mask). For example, AU1 and AU2 (e.g., as described herein) may be assigned to a first semantic mask (e.g., a semantic mask associated with the eyebrows), AU6 (associated with a cheek raise) may be assigned to a second semantic mask, AU17 (associated with a chin raise) may be assigned to a third semantic mask, and so forth. In these or other embodiments, the AUs may be assigned to an associated semantic mask based on the location of the AU relative to the human face and the location of the semantic mask relative to the human face.

In some embodiments, the neural network architecture 115 may be configured to normalize the AU intensities for the individual AUs, for use in a hyperspace, as described herein. For example, the neural network architecture 115 may normalize the AU intensities (e.g., which may be a range of intensities between a minimum intensity value and a maximum intensity value, such as from zero to five) to be a control value between negative one and one. In some embodiments, the neural network architecture 115 may use the following equation to normalize the AU intensities:

$$AU' = \min\left(\frac{AU - AU_{min}}{\alpha AU_{max} - AU_{min}} * 2 - 1, 1\right)$$

where AU' may be the normalized AU intensity, AU may be the AU intensity, $AU_{min}$ may be the minimum intensity value, $AU_{max}$ may be the maximum intensity value, and $\alpha$ may be a factor for adjusting the maximum intensity value. For example, $\alpha$ may be any value greater than $AU_{min}/AU_{max}$ and less than or equal to one, such as 0.4, 0.5, 0.8, and so forth.

In these or other embodiments, the neural network architecture 115 may be configured to obtain the multiple frames of the first data, the semantic masks, and/or the AUs (which may be the AUs, the AU intensities, and/or the AU blocks, as described herein) and the neural network architecture 115 may be configured to build a facial hyperspace. In some embodiments, the neural network architecture 115 building the facial hyperspace may be via a neural radiance field and/or a variation thereof, such as a neural radiance field (NeRF), higher-dimensional representation for topologically varying neural radiance fields (HyperNeRF), controllable neural radiance field (CoNeRF), and the like. Alternatively, or additionally, the neural network architecture 115 building the facial hyperspace may be via the network architecture(s) as illustrated and described relative to FIGS. 2 and 3.

In some embodiments, the facial hyperspace may refer to a representation of a number of dimensional fields, which may include at least a time dimension and/or a radiance dimension. For example, a 3D ray may be converted to a 5D representation, having a 3D point associated with the 3D ray and two axis-angle ray directions. In some embodiments, the facial hyperspace representation, as described in the present disclosure, may support topological variations in a dynamic object to be represented and/or captured. In some embodiments, the hyperspace may represent topological variations (e.g., in 2D) of an input image, such as a human face, where the topological variations may include changes to features/attributes of the input image and/or where the topological variations of the facial hyperspace may be used to produce more realistic renderings of the input image. For example, the topological variations of the facial hyperspace for a human face may include changes to facial features (e.g., raised eyebrows, open mouth, pursed lips, etc.), such that the facial hyperspace may include many iterations of topological variations, that may be subsequently used to render a synthetic human face (e.g., an avatar, as described herein) having realistic expressions based on the facial features in the topological variations. In general, the facial hyperspace may be a collection of a 3D point and a variable number of parameters (e.g., dimensions) that may be associated with the 3D point.

In some embodiments, the neural network architecture 115 may be configured to generate a synthetic image that may be similar to the human face included in the first data. The neural network architecture 115 may generate the synthetic image based on the human face included in the first data, such as from a frame of the multiple frames (e.g., an input frame or an input face). For example, the neural network architecture 115 may obtain and use an individual frame including a human face as an initial image for the synthetic image. Alternatively, or additionally, the neural network architecture 115 may obtain one or more inputs corresponding to the AU intensities associated with the input face. The neural network architecture 115 may be configured to generate the synthetic image using a combination of the input face (e.g., included in a frame of the multiple frames) and the AU intensities, such that the synthetic image may appear similar to the input face (e.g., in instances in which the input face is associated with a first person, the synthetic image may have a similar appearance as the first person) and/or may include a facial expression similar to or different from the input face. For example, the input face may include a first expression (e.g., eyes open and mouth closed) and the neural network architecture 115 may generate a synthetic image of a similar human face having a second expression (e.g., eyes closed and mouth open).

In some embodiments, the display device 120 may obtain the synthetic image from the neural network architecture 115 and may display the synthetic image. The display of the synthetic image on the display device 120 may be an avatar of the human face included in the first data. In some embodiments, the avatar displayed on the display device 120 may have a first expression, that may be associated with the input face and/or the AU intensities obtained by the neural network architecture 115.

In some embodiments, the expression associated with the avatar may be modified by one or more variations to the inputs to the neural network architecture 115, including the input face and/or the AU intensities. For example, one or more AU intensities may be modified, and the avatar displayed on the display device 120 may update accordingly. In some embodiments, modifications to a first AU intensity may be reflected in the avatar independent of a modification to a second AU intensity. For example, a modification to the AU intensity associated with AU1 (e.g., an inner eyebrow raiser) may cause a change of facial expression in the avatar and the portion of the avatar associated with AU2 (e.g., an outer eyebrow raiser) may remain unchanged. Alternatively, or additionally, a modification to a first AU intensity (e.g., that may modify a facial expression associated with the avatar) may cause a modification to a second AU intensity, which may or may not be related to the first AU intensity, and/or a modification to the facial expression of the avatar. For example, a modification to the AU intensity associated with AU6 (e.g., a cheek raiser) may cause a modification to the AU intensity associated with AU12 (e.g., lip corner puller) and subsequently, a modification to the facial expression in the avatar. In some embodiments, modifications to a first AU intensity that may cause a modification to a second AU intensity may be associated with an emotion (e.g., happiness may be related to AU6 and AU12), related facial muscles, and the like.

In some embodiments, an expression corresponding to a first avatar (e.g., a facial expression of the human face included in the input data) may be copied and/or transferred to a second avatar for display, such as on the display device 120. For example, a first expression corresponding to a first avatar may be described by an expression description including one or more AUs, one or more associated AU intensities, and/or one or more AU blocks, as described herein. Using the expression description associated with the first avatar, the first expression may be applied to a second avatar, such as by transferring and/or applying the expression description to the second avatar. In such embodiments, an expression of a first avatar (e.g., associated with a first human face) may be applied to a second avatar (e.g., associated with a second human face) such that the first avatar and the second avatar may have a substantially similar expression (e.g., closed-mouth smile, scowl, etc.).

Modifications, additions, or omissions may be made to the environment 100 without departing from the scope of the present disclosure. For example, in some embodiments, the image detection module 110 and the neural network architecture 115 may be combined such that the neural network architecture 115 may be configured to perform some or all of the functions associated with the image detection module 110 as described herein. Alternatively, or additionally, in some embodiments, the environment 100 may include any number of other components that may not be explicitly illustrated or described.

Figure 2:
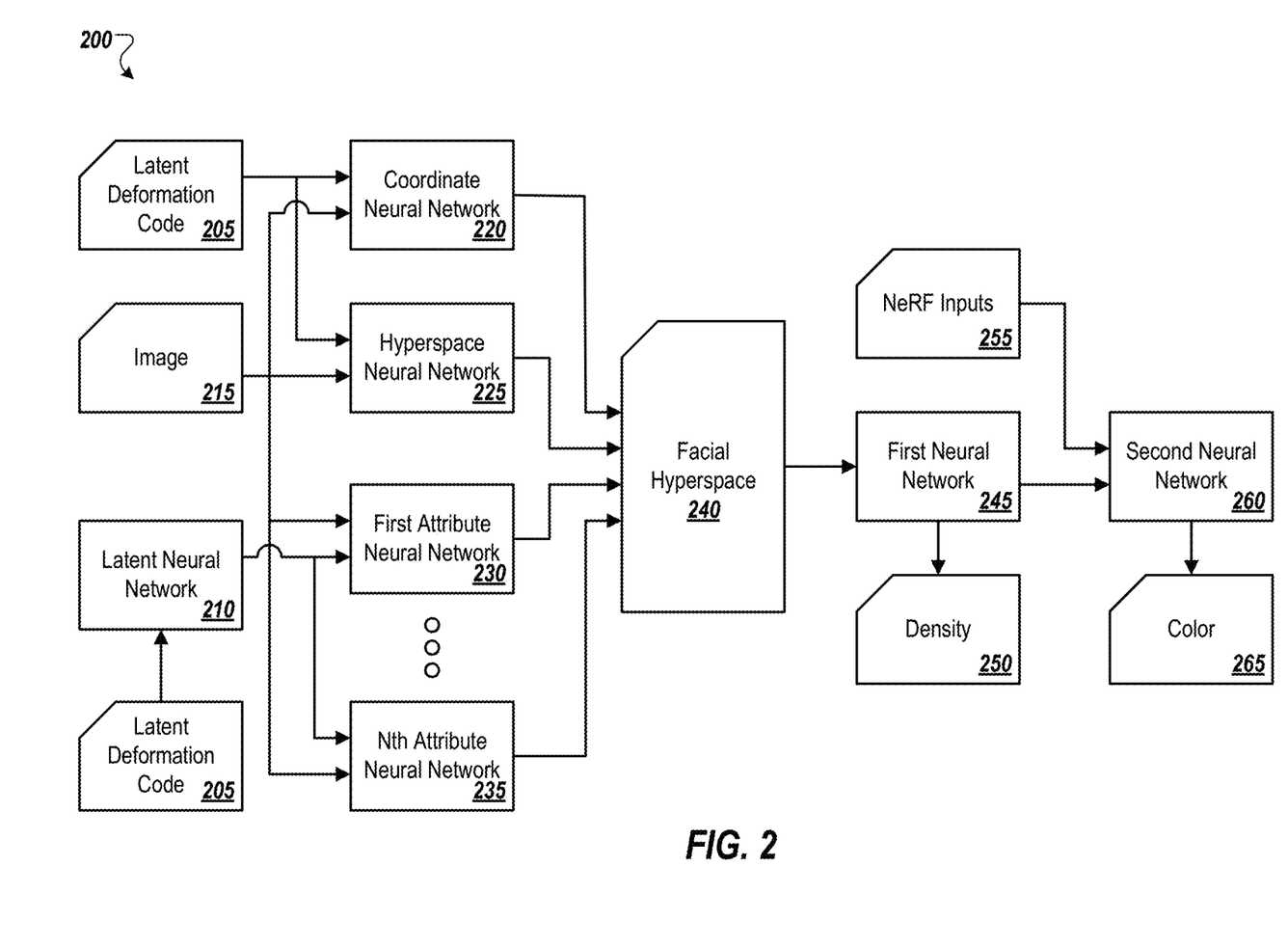
FIG. 2 is a block diagram of an example network architecture configured to support avatar control.

FIG. 2 is a block diagram of an example network architecture 200 configured to support avatar control, in accordance with at least one embodiment of the present disclosure. The network architecture 200 may include a latent neural network 210, a coordinate neural network 220, a hyperspace neural network 225, a first attribute neural network 230, an nth attribute neural network 235, a first neural network 245, and a second neural network 260.

In some embodiments, the latent neural network 210, the coordinate neural network 220, the hyperspace neural network 225, the first attribute neural network 230, the nth attribute neural network 235, the first neural network 245, and/or the second neural network 260 (collectively referred to as the avatar neural networks) may be feedforward artificial neural networks, where nodes included in the avatar neural networks may be acyclic. For example, the avatar neural networks may include a single layer perceptron network, a multi-layer perceptron network, a directed acyclic graph network, and/or any other feedforward artificial neural network.

In some embodiments, the latent neural network 210 may obtain a latent deformation code 205. In some embodiments, the latent deformation code 205 may be a numerical value that may be associated with and/or obtained from an image 215. The latent deformation code 205 may be used to recreate at least a portion of the image 215 using data obtained relative to the image 215. For example, the latent deformation code 205 may be used to represent and/or reconstruct a generalized portion of the image 215 from data associated with the image 215. In some embodiments, the latent deformation code 205 may be related to a frame number associated with a video capture of the image 215. For example, the image 215 may be the frame number of a video of the image 215. In another example, the latent deformation code 205 may be the time stamp of an individual frame of the video of the image 215.

In some embodiments, the image 215 may be the same or similar as the first data from the data source 105 in FIG. 1. As such, the image 215 may include, but not be limited to, one or more images, a video stream, and/or other representations of a scene that may include multiple frames taken of the scene. In some embodiments, the image 215 may be sampled such that individual points and/or rays associated with the image 215 may be used in processing by one or more of the avatar neural networks, as described herein.

In some embodiments, the latent neural network 210 may output one or more attributes associated with the image 215. In some embodiments, the attributes from the latent neural network 210 may be related to the AUs described relative to FIG. 1. In some embodiments, the individual attributes output from the latent neural network 210 may be input into a corresponding attribute neural network. For example, a first attribute output from the latent neural network 210 may be input into the first attribute neural network 230, and so forth, up to an nth attribute output from the latent neural network 210 may be input into the nth attribute neural network 235. In some embodiments, the attributes may include corresponding strength values that may be associated with a local attribute associated with the image 215, such as the AUs, and/or the AU intensities.

In some embodiments, the coordinate neural network 220 may obtain the latent deformation code 205 and/or the image 215 (which may include a portion of the image 215). In some embodiments, the latent deformation code 205 and the image 215 may be concatenated together and obtained by the coordinate neural network 220. In some embodiments, the input from the image 215 to the coordinate neural network 220 may include a point (e.g., a pixel) from the image 215, a ray associated with the point from the image 215, and/or a combination thereof, referred to as a sampled image coordinate. For example, the input to the coordinate neural network 220 may include the sampled image coordinate including a 3D position (e.g., an x-coordinate, a y-coordinate, and a z-coordinate) and a 2D view direction (e.g., an origin (which may be the 3D position of the sampled image coordinate, having an x-coordinate, a y-coordinate, and a z-coordinate), and a direction), concatenated with the latent deformation code 205.

In some embodiments, an output from the coordinate neural network 220 may include a warped coordinate, which may be obtained by the equation:

$$x'=T(x,\omega_i)$$

where x' may be the warped coordinate, x may be the sampled image coordinate, oi may be the latent deformation code 205, and T may be the coordinate neural network 220. In some embodiments, the warped coordinate may be included as at least a portion of a facial hyperspace 240, among other elements as described herein. For example, the warped coordinate may be a coordinate within the facial hyperspace 240.

The hyperspace neural network 225 may be similar to the coordinate neural network 220 in that the hyperspace neural network 225 may obtain the sampled image coordinate and/or the latent deformation code 205 as inputs. In some embodiments, the latent deformation code 205 and the sampled image coordinate may be concatenated together and obtained by the hyperspace neural network 225. Alternatively, or additionally, the latent deformation code 205 and the image 215 may be concatenated together and the result may be obtained by both the coordinate neural network 220 and the hyperspace neural network 225.

In some embodiments, an output from the hyperspace neural network 225 may include a hyperspace code, which may be obtained by the equation:

$$w = H(x, \omega_i)$$

where w may be the hyperspace code, x may be the sampled image coordinate, $\omega_i$ may be the latent deformation code 205, and H may be the hyperspace neural network 225. In some embodiments, the hyperspace code may be included as a component of a facial hyperspace 240. For example, the hyperspace code may represent a coordinate in an ambient space that may be included in the facial hyperspace 240 and the hyperspace code may be used in various operations associated with generating an avatar, such as determining one or more colors and/or one or more densities that may be used for rendering one or more portions of the avatar.

In some embodiments, the neural networks associated with the attributes output from the latent neural network 210 (e.g., including the first attribute neural network 230 through the nth attribute neural network 235) may obtain the respective attributes from the latent neural network 210 and/or the sampled image coordinate as inputs. In some embodiments, the respective attributes and the sampled image coordinate may be concatenated together and obtained by the first attribute neural network 230 and/or the nth attribute neural network 235, respectively. For example, the first attribute neural network 230 may obtain a concatenation of the sampled image coordinate and the first attribute, and the nth attribute neural network 235 may obtain a concatenation of the sampled image coordinate and the nth attribute.

Figure 3:
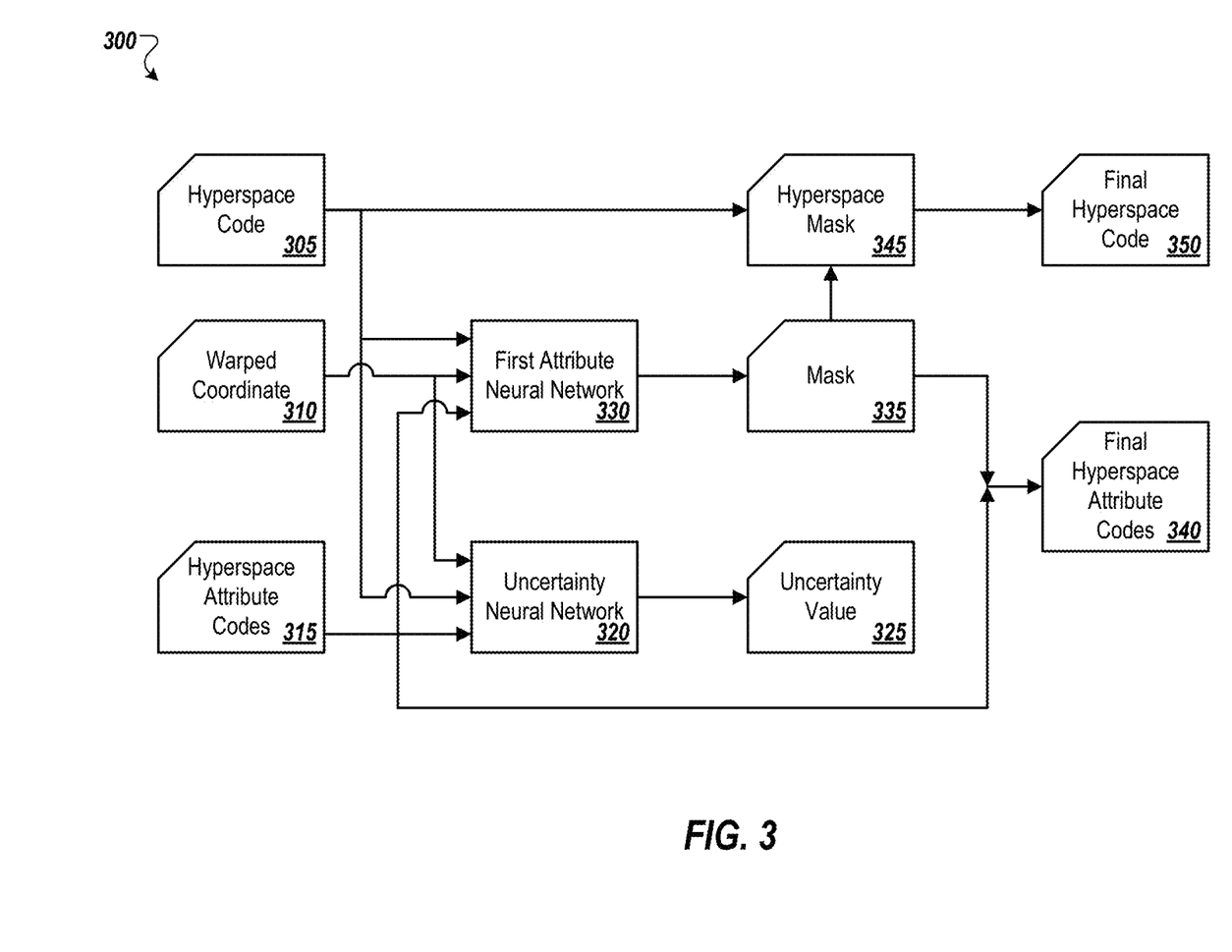
FIG. 3 is a block diagram of another example network architecture configured to support avatar control.

In some embodiments, an output from the first attribute neural network 230 and/or the nth attribute neural network 235 may include hyperspace attribute codes, which may be obtained by the equation:

$$w_i = H_i(x, \alpha_i); \; i = 1 \ldots n$$

where $w_i$ may be the hyperspace attribute code for the $i^{th}$ attribute, x may be the sampled image coordinate, $\alpha_i$ may be the $i^{th}$ attribute from the latent neural network 210 (up to and including the nth attribute), and $H_i$ may be the $i^{th}$ attribute neural network (e.g., i may vary from the first attribute neural network 230 to the nth attribute neural network 235). In some embodiments, the hyperspace attribute codes may be included as one or more components of the facial hyperspace 240. Alternatively, or additionally, the hyperspace attribute codes may be further processed, such as by one or more additional neural networks, such as described relative to the network architecture 300 of FIG. 3.

In some embodiments, the facial hyperspace 240 may be a multidimensional vector, that may be formed using one or more dimensions associated with the warped coordinate, one or more dimensions associated with the hyperspace code, and/or one or more dimensions associated with the hyperspace attributes codes. For example, a point in the facial hyperspace 240 may include x, y, and z coordinates associated with the warped coordinate, a $w_0$ coordinate associated with the hyperspace code, and/or $w_i \ldots w_n$ coordinates associated with the hyperspace attribute codes, as described herein.

In some embodiments, the first neural network 245 may obtain the elements of the facial hyperspace 240 vector (e.g., the warped coordinate, the hyperspace code, and/or the hyperspace attributes codes) and may output a density 250, where the density 250 may be associated with a color (e.g., a color density) used in generating a synthetic image and/or an avatar, as described herein. In some embodiments, the density 250 may be output from the first neural network 245, where the density 250 may be obtained by the equation:

$$\sigma = F(x', W)$$

where $\sigma$ may be the density 250, x' may be the warped coordinate, W may be the elements of the facial hyperspace 240, not including the warped coordinate, and F may be the first neural network 245.

In some embodiments, the second neural network 260 may obtain the output of the first neural network 245 and may output a color 265, where the color 265 may be a color used in generating a synthetic image and/or an avatar, as described herein. Alternatively, or additionally, the second neural network 260 may obtain one or more NeRF inputs 255 that may be used by the second neural network 260 in determining the color 265. In some embodiments, the NeRF inputs 255 may include a latent appearance code and/or a view direction, where the view direction may be associated with the synthetic image and/or avatar that may be generated by the network architecture 200. In some embodiments, the color 265 may be output from the second neural network 260, where the color 265 may be obtained by the equation:

$$c = G(F', d, \psi)$$

where c may be the color 265, F' may be the output from the first neural network 245 (e.g., based on x', the warped coordinate and W, the elements of the facial hyperspace 240), d may be the viewing direction, $\psi$ may be the latent appearance code, and G may be the second neural network 260. In some embodiments, the output from the first neural network 245, the viewing direction, and/or the latent appearance code may be concatenated together and input into the second neural network 260.

In some embodiments, the density 250 and/or the color 265 may be used to generate an avatar for display on a display device. In some embodiments, the avatar based on the density 250 and/or the color 265 may be similar to the image 215. Alternatively, or additionally, the avatar may include one or more differences from the image 215, such as a different facial expression, based on various attributes that may be input and/or selected within the network architecture 200.

In some embodiments, once an avatar associated with a first human face (e.g., the avatar depicting the first human face that may have been input into the network architecture 200) is generated, the AUs, the AU intensities, and/or the AU blocks associated with the generated avatar may be copied and/or used with a second human face, such that an expression associated with the first human face may be replicated in an avatar depicting the second human face. For example, the AUs, the AU intensities, and/or the AU blocks may be detected relative to a first human face (e.g., such as an avatar depicting the first human face) and the detected values (e.g., the AUs, AU intensities, and/or AU blocks) may be applied to a second avatar that depicts a second human face, such that an expression associated with the first human face may be transferred to the second avatar depicting the second human face.

Modifications, additions, or omissions may be made to the network architecture 200 without departing from the scope of the present disclosure. For example, in some embodiments, the network architecture 200 may include any number of other components that may not be explicitly illustrated or described.

FIG. 3 is a block diagram of an example network architecture 300 configured to support avatar control, in accordance with at least one embodiment of the present disclosure. The network architecture 300 may include an uncertainty neural network 320 and a first attribute neural network 330. In some embodiments, the network architecture 300 may utilize, generate, and/or act on various components of data, such as a hyperspace code 305, a warped coordinate 310, hyperspace attribute codes 315, a mask 335, an uncertainty value 325, final hyperspace attribute codes 340, a hyperspace mask 345, and a final hyperspace code 350.

In some embodiments, the uncertainty neural network 320 and/or the first attribute neural network 330 may be feed-forward artificial neural networks, where nodes included in the uncertainty neural network 320 and/or the first attribute neural network 330 may be acyclic. For example, the uncertainty neural network 320 and/or the first attribute neural network 330 may individually include a single layer perceptron network, a multi-layer perceptron network, a directed acyclic graph network, and/or any other feedforward artificial neural network.

In some embodiments, the uncertainty neural network 320 may obtain a hyperspace code 305, a warped coordinate 310, and/or one or more hyperspace attribute codes 315. In some embodiments, the hyperspace code 305 may be obtained from a neural network, such as an output from the hyperspace neural network 225 of FIG. 2. In some embodiments, the warped coordinate 310 may be obtained from a neural network, such as an output from the coordinate neural network 220 of FIG. 2. In some embodiments, the hyperspace attribute codes 315 may be obtained from one or more neural networks, such as outputs from the first attribute neural network 230 and/or the nth attribute neural network 235 of FIG. 2.

In some embodiments, the uncertainty neural network 320 may be configured to output an uncertainty value 325. In some embodiments, the uncertainty value 325 may be associated with an attribute included in the network architecture 300. For example, as described relative to the network architecture 200 of FIG. 2, the hyperspace attribute codes (e.g., the hyperspace attribute codes 315) may be obtained from the first attribute neural network 230 based on an attribute input. As such, the hyperspace attribute codes 315 may be individually associated with an attribute in the network architecture, such as the network architecture 300 and/or the network architecture 200 of FIG. 2. In these or other embodiments, the uncertainty value 325 may be used to reduce potential noise between one or more AUs included in the network architecture 300. For example, a first uncertainty value may be determined for a first AU (e.g., that may be associated with a first attribute) and a second uncertainty value may be determined for a second AU, where the first uncertainty value and/or the second uncertainty value may contribute to reducing noise of other attributes relative to the respective attribute (e.g., the first uncertainty value relative to the first attribute and the second uncertainty value relative to the second attribute). In these or other embodiments, the uncertainty value 325 may be obtained by the equation:

$$\beta_i = B_i(x', w_0, w_i); i=1 \ldots n$$

where $\beta_i$ may be the uncertainty value 325, x' may be the warped coordinate 310, $w_0$ may be the hyperspace code 305, $w_i$ may be the hyperspace attribute codes 315 where each it attribute code may be associated with an $i^{th}$ attribute, and $B_i$ may be the uncertainty neural network 320.

In some embodiments, the first attribute neural network 330 may obtain a hyperspace code 305, a coordinate 310, and/or one or more hyperspace attribute codes 315. In some embodiments, the first attribute neural network 330 may be configured to output a mask 335. The mask 335 may be associated with the semantic masks as described relative to FIG. 1 herein. In some embodiments, the mask 335 may be associated with one or more attributes from the first data (e.g., attributes associated with a human face). For example, multiple attributes may be associated with the mask 335, similar to multiple AUs being associated with a single semantic mask as described relative to FIG. 1. In these or other embodiments, the mask 335 may be configured to reduce and/or cancel out effects that may be caused by attributes not included in the mask 335. For example, in instances in which a first attribute is included in a semantic mask and a second attribute is not included in the semantic mask, the mask 335 may filter out an effect caused by the second attribute relative to the first attribute. In some embodiments, the mask 335 may be obtained by the equation:

$$m_j = M_j(x', w_0, w_{j_1} \ldots w_{j_p})$$

where $m_j$ may be the mask 335, x' may be the warped coordinate 310, $w_0$ may be the hyperspace code 305, $w_{j_1} \ldots w_{j_p}$ may be the hyperspace attribute codes 315, and $M_j$ may be the first attribute neural network 330.

In some embodiments, the hyperspace attribute codes 315 may be combined with the mask 335 to obtain the final hyperspace attribute codes 340. In some embodiments, the final hyperspace attribute codes 340 may be included as one or more components of a facial hyperspace, such as the facial hyperspace 240 of FIG. 2. In some embodiments, the final hyperspace attribute codes 340 may be obtained by a pixel-wise multiplication between the hyperspace attribute codes 315 and the mask 335, illustrated by the equation:

$$w'_i = w_i \cdot m_j$$

where $w'_i$ may be the final hyperspace attribute codes 340, $w_i$ may be the hyperspace attribute codes 315, and $m_j$ may be the mask 335 (e.g., the mask with which the attribute may be related).

In some embodiments, the hyperspace mask 345 may obtain the hyperspace code 305 and the mask 335 and may output the final hyperspace code 350, where the final hyperspace code 350 may be the hyperspace value that may be included in a facial hyperspace, such as the facial hyperspace 240 of FIG. 2. In some embodiments, the hyperspace mask 345 may obtain a mask 335 that may be associated with an attribute, such that the hyperspace mask 345 may include multiple masks as an input. In some embodiments, determining the final hyperspace code 350 may be obtained by multiplying a combination of the masks 335 with the hyperspace code 305, illustrated by the equation:

$$w'_0 = \left(1 - \sum_n m_n\right) * w_0$$

where $w_0'$ may be the final hyperspace code 350, $w_0$ may be the hyperspace code 305, $m_n$ may be the $n^{th}$ mask 335 (such that one minus a summation of the n masks may be multiplied with the hyperspace code 305). In some embodiments, the multiplication of the hyperspace code 305 (e.g., $w_0$) with the value of one minus the summation of the n masks may be a pixel-wise multiplication.

In these or other embodiments, a mask field may be rendered into a synthetic image using volume rendering techniques and using at least a ray associated with a portion of first data (e.g., an image of a human face), a color density (e.g., such as the density 250 of FIG. 2), and the mask 335 associated with the first data. The mask field may be rendered using the equation:

$$M(r|\theta,\beta_c) = \int_{t_n}^{t_f} T(t)\sigma(r(t))m(r(t),d)dt$$

where M may be the mask field in view of a ray r having an origin θ, T may be a calculated value based on the density σ and the ray r, as a function of time t, σ may be the density as a function of the ray r, and m may be the mask as a function of the ray r and the ray direction d. Alternatively, or additionally, the mask field may be determined over the bounds of the ray, represented as a near bound $t_n$ and a far bound $t_f$. The calculated value T may be determined using the equation:

$$T(t) = \exp(-\int_{t_n}^{t} \sigma(r(t))dt)$$

where the variables may be the same as those described above relative to the mask field.

In some embodiments, one or more losses associated with the synthetic image relative to the input image (e.g., a human face included in the first data) may be determined, and/or may be used to modify the neural networks that may be used to determine the synthetic image. In some embodiments, the one or more determined losses may include reconstruction losses (e.g., losses associated with reconstructing the synthetic image based on the input image) and/or control losses (e.g., losses that may be associated with the one or more masks and/or the one or more attributes used in generating the synthetic image). Although described relative to FIG. 3, the losses may be part of an entire system, such as the environment 100 of FIG. 1 and/or the architecture 200 of FIG. 2. In some embodiments, the losses may be determined given a set of training images C and the equation:

$$\arg\min_{\theta,\{\mu_c\}} L_{rec}(\theta, \mu_c) + L_{ctrl}(\theta, \mu_c)$$

where θ may be network parameters associated with the neural networks used to determine the synthetic image, and $\mu_c$ may be latent deformation code and/or latent appearance code, as described herein.

In some embodiments, the reconstruction losses (e.g., $L_{rec}$) may include two parts: a primary reconstruction loss associated with reconstructing input observations (e.g., $L_{recon}$) and a Gaussian prior on the latent codes (e.g., $L_{reg}$). The primary reconstruction loss may be determined using the equation:

$$L_{recon} = \sum_{r \in R} \|C(r|\theta, \beta_c) - C^{gt}(r)\|_2^2$$

where C is the set of training images given a ray r having an origin θ, $C^{gt}$ is a ground truth of the set of training images for each ray r, and the primary reconstruction loss is summed for each ray r included in the set of rays R. In some embodiments, the Gaussian prior may be determined using the equation:

$$L_{reg} = \sum_c \|\mu_c\|_2^2$$

where $\mu_c$ may be latent deformation code and/or latent appearance code, as described herein.

Alternatively, or additionally, the control losses (e.g., $L_{ctrl}$) may include two parts: an attribute mask loss (e.g., $L_{mask}$) and/or an attribute value loss (e.g., $L_{attr}$). The attribute mask loss may be determined using the equation:

$$L_{mask} = \sum_{r,a} \delta_{c,a} CE(M(r|\theta, \beta_c), M_{c,a}^{gt}(r))$$

where $\delta_{c,a}$ may be an indicator where $\delta_{c,a}=1$ may indicate an attribute a for an image c is provided and $\delta_{c,a}=0$ alternatively, CE may represent a cross entropy of a mask field M relative to a ground truth mask field Mgt, and $M_{c,a}^{gt}(r)$ may be an $a^{th}$ attribute associated with a $c^{th}$ image. In some embodiments, the attribute value loss may be determined using the equation:

$$L_{attr} = \sum_c \sum_a \left(\delta_{c,a} \frac{|\alpha_{c,a} - a_{c,a}^{gt}|^2}{2\beta_{c,a}^2} + \frac{(\log\beta_{c,a})^2}{2}\right)$$

where . . . .

In these or other embodiments, a final loss may be a summation of the individual losses determined herein (e.g., . . . ). Alternatively, or additionally, the final loss may include one or more weighting coefficients. The total loss may be determined by the equation:

$$L_{final} = L_{recon} + w_{reg}L_{reg} + w_{mask}L_{mask} + w_{attr}L_{attr}$$

where $L_{final}$, $L_{recon}$, $L_{reg}$, $L_{mask}$, and $L_{attr}$ may be the final loss, the primary reconstruction loss, the Gaussian prior on the latent codes, the attribute mask loss, and the attribute value loss, respectively, as described herein, and $w_{reg}$, $w_{mask}$, and $w_{attr}$ may be weighting coefficients individually associated with the corresponding loss values. In some embodiments, the weighting coefficients may be predetermined and/or fixed values, such as a value between zero and one. Alternatively, or additionally, the weighting coefficients may be adjusted, such as by one or more neural networks, during the course of determining the synthetic image based on the input image.

In some embodiments, methods of generating a synthetic image using one or more methods as described in the present disclosure compared to existing methods may illustrate at least some improvements of the present disclosure over the existing methods. For example, comparing the present disclosure (PD) with CoNeRF using Intraclass Correlation (ICC) based on AU intensities obtained from synthesized images yields the following:

| AU | CoNeRF | PD |
|---|---|---|
| 01 | 0.52 | 0.86 |
| 02 | 0.54 | 0.73 |
| 04 | 0.23 | 0.91 |
| 05 | −0.11 | 0.40 |
| 06 | 0.00 | 0.00 |
| 07 | −0.44 | 0.73 |
| 09 | 0.55 | 0.74 |
| 10 | 0.00 | 0.00 |
| 12 | 0.00 | 0.87 |
| 14 | 0.17 | 0.77 |
| 15 | −0.15 | 0.81 |
| 17 | 0.31 | 0.88 |
| 20 | 0.03 | 0.63 |
| 23 | 0.49 | 0.82 |
| 25 | 0.36 | 0.90 |
| 26 | 0.08 | 0.93 |
| 45 | 0.21 | 0.83 |
| Mean | 0.16 | 0.69 |

In another comparison between the PD and existing methods, a peak signal-to-noise ratio (PSNR), multi-scale structural similarity (MS-SSIM), and learned perceptual image patch similarity (LPIPS) may be used to evaluate rendering quality of images, such as frame interpolation tasks on input data. The existing methods included in the comparison illustrated herein includes NeRF, NeRF+Latent, Nerfies, HyperNeRF, CoNeRF-M, and CoNeRF.

| Method | PSNR | MS-SSIM | LPIPS |
|---|---|---|---|
| NeRF | 28.795 | 0.951 | 0.210 |
| NeRF + Latent | 32.653 | 0.981 | 0.182 |
| Nerfies | 32.274 | 0.981 | 0.180 |
| HyperNeRF | 32.520 | 0.981 | 0.169 |
| CoNeRF-M | 32.061 | 0.979 | 0.167 |
| CoNeRF | 32.342 | 0.981 | 0.168 |
| PD | 32.356 | 0.982 | 0.166 |

Modifications, additions, or omissions may be made to the network architecture 300 without departing from the scope of the present disclosure. For example, in some embodiments, the network architecture 300 may include any number of other components that may not be explicitly illustrated or described.

FIG. 4 illustrates an example environment 400 including multiple masks applied to a human face, in accordance with at least one embodiment of the present disclosure. In some embodiments, the environment 400 may include a first semantic mask 405, a second semantic mask 410, and a third semantic mask 415 (collectively referred to as the semantic masks).

In some embodiments, the semantic masks may be associated with a human face, such as overlaying portions of a human face. In some embodiments, the semantic masks may be automatically generated by a device, such as a neural network as described herein. In some embodiments, the semantic masks may be automatically generated based on facial landmarks that may have been detected relative to the human face, as described herein. Although illustrated as three semantic masks (e.g., the first semantic mask 405, the second semantic mask 410, and the third semantic mask 415), more or less semantic masks may be automatically generated relative to a human face, which may be based on various groupings of the facial landmarks.

Modifications, additions, or omissions may be made to the environment 400 without departing from the scope of the present disclosure. For example, in some embodiments, the environment 400 may include any number of other components that may not be explicitly illustrated or described.

Figure 5:
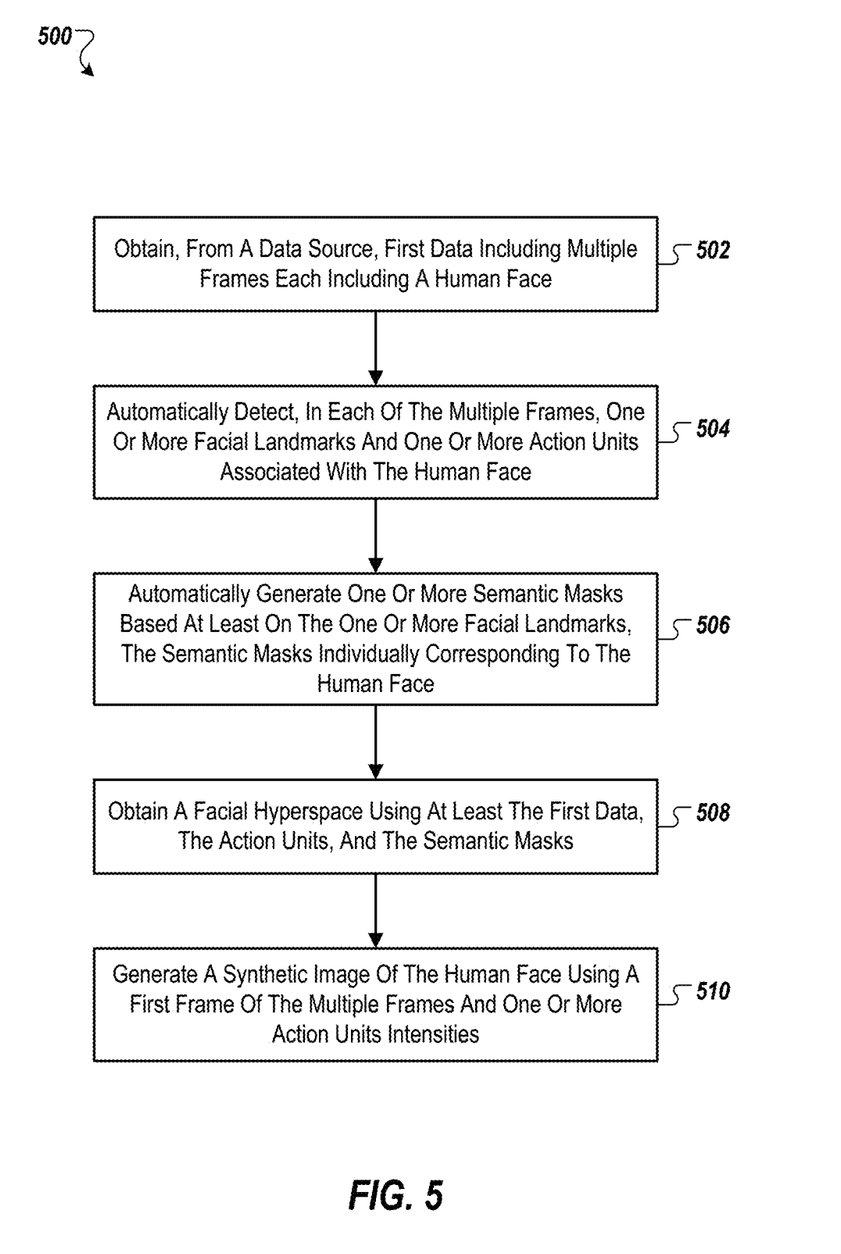
FIG. 5 is a flowchart of an example method of avatar control.

FIG. 5 is a flowchart of an example method 500 of avatar control, in accordance with at least one embodiment of the present disclosure. One or more operations of the method 500 may be performed, in some embodiments, by a device or system, or combination of devices or systems. In these and other embodiments, the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 500 may begin at block 502 where first data may be obtained from a data source (e.g., the data source 105 of FIG. 1). In some embodiments, the first data may include multiple frames, each including a human face. In some embodiments, the first data may be a slow-motion video recording. Alternatively, or additionally, the data source may be a single video recording device. In some embodiments, the data source may obtain the first data and an image detection module may obtain the first data therefrom.

At block 504, one or more facial landmarks may be automatically detected in each of the multiple frames, such as by an image detection module (e.g., the image detection module 110 of FIG. 1). Alternatively, or additionally, one or more AUs may be automatically detected in each of the multiple frames by the image detection module. In these or other embodiments, the one or more facial landmarks and/or the one or more AUs may be associated with the human face. In some embodiments, the facial landmarks and/or the AUs may be automatically detected by an image detection module and/or a computing device associated with the image detection module. In some embodiments, the image detection module may be combined with a neural network architecture, as described herein.

At block 506, one or more semantic masks may be automatically generated. In some embodiments, the one or more semantic masks may be based at least on the one or more facial landmarks, where the one or more semantic masks may individually correspond to the human face. In some embodiments, the one or more AUs may be individually assigned to the one or more semantic masks based on a location of the one or more AUs relative to a boundary of the one or more semantic masks. In some embodiments, the semantic masks may be automatically generated by the image detection module. Alternatively, or additionally, the semantic masks may be automatically generated by the neural network architecture.

At block 508, a facial hyperspace may be built using at least the first data, the one or more AUs, and/or the semantic masks by a neural network architecture (e.g., the neural network architecture 115 of FIG. 1). In some embodiments, building the facial hyperspace may include inputting the first data, the one or more AUs, and/or the semantic masks into a network architecture. In some embodiments, the network architecture may include at least a latent neural network, a coordinate neural network, a hyperspace neural network, and/or an attribute neural network. Alternatively, or additionally, the network architecture may be first trained using the first data, the one or more AUs, and/or the semantic masks and the network architecture may subsequently generate the synthetic image using the first data and the AU intensities.

At block 510, a synthetic image of the human face may be generated using a first frame of the multiple frames and/or one or more AU intensities individually associated with the one or more actions units. In some embodiments, a modification to the one or more AU intensities may cause a modification to a facial expression associated with the synthetic image. In some embodiments, the synthetic image may be generated by the neural network architecture, which may include one or more multi-layer perceptrons, as described herein.

In some embodiments, the synthetic image may be displayed on a display device (e.g., the display device 120 of FIG. 1). The displayed synthetic image may be representative of the human face. In some embodiments, the AU intensities may be normalized based on a minimum intensity value and/or a maximum intensity value associated with the AU intensities.

Modifications, additions, or omissions may be made to the method 500 without departing from the scope of the present disclosure. For example, in some embodiments, the method 500 may include any number of other components that may not be explicitly illustrated or described.

Figure 6:
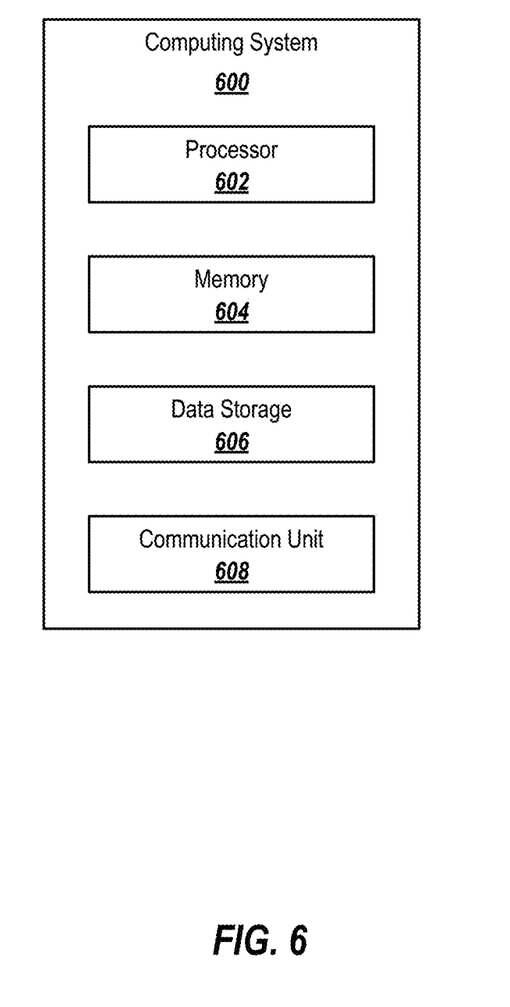
FIG. 6 illustrates an example computing system that may be used for avatar control.

FIG. 6 illustrates an example computing system 600 that may be used for avatar control, in accordance with at least one embodiment of the present disclosure. The computing system 600 may be configured to implement or direct one or more operations associated with avatar control, which may include operation of one or more components included in the environment 100 of FIG. 1, the network architecture 200 of FIG. 2, the network architecture 300 of FIG. 3, and/or performance of the method 500 of FIG. 5. The computing system 600 may include a processor 602, memory 604, data storage 606, and a communication unit 608, which all may be communicatively coupled. In some embodiments, the computing system 600 may be part of any of the systems or devices described in this disclosure.

The processor 602 may include any computing entity, or processing device including various computer hardware or software modules and may be configured to execute instructions stored on any applicable computer-readable storage media. For example, the processor 602 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 6, it is understood that the processor 602 may include any number of processors distributed across any number of networks or physical locations that are configured to perform individually or collectively any number of operations described herein.

In some embodiments, the processor 602 may be configured to interpret and/or execute program instructions and/or process data stored in the memory 604, the data storage 606, or the memory 604 and the data storage 606. In some embodiments, the processor 602 may fetch program instructions from the data storage 606 and load the program instructions in the memory 604. After the program instructions are loaded into memory 604, the processor 602 may execute the program instructions.

For example, in some embodiments, the processor 602 may be configured to interpret and/or execute program instructions and/or process data stored in the memory 604, the data storage 606, or the memory 604 and the data storage 606. The program instruction and/or data may be related to avatar control such that the computing system 600 may perform or direct the performance of the operations associated therewith as directed by the instructions. In these and other embodiments, the instructions may be used to perform the method 500 of FIG. 5.

The memory 604 and the data storage 606 may include computer-readable storage media or one or more computer-readable storage mediums for carrying or having computer-executable instructions or data structures stored thereon. Such computer-readable storage media may be any available media that may be accessed by a computer, such as the processor 602.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a computer. Combinations of the above may also be included within the scope of computer-readable storage media.

Computer-executable instructions may include, for example, instructions and data configured to cause the processor 602 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of *In re Nuijten,* 500 F.3d 1346 (Fed. Cir. 2007). Combinations of the above may also be included within the scope of computer-readable media.

The communication unit 608 may include any component, device, system, or combination thereof that is configured to transmit or receive information over a network. In some embodiments, the communication unit 608 may communicate with other devices at other locations, the same location, or even other components within the same system. For example, the communication unit 608 may include a modem, a network card (wireless or wired), an infrared communication device, a wireless communication device (such as an antenna implementing 4G (LTE), 4.5G (LTE-A), and/or 5G (mmWave) telecommunications), and/or chipset (such as a Bluetooth® device (e.g., Bluetooth 5 (Bluetooth Low Energy)), an 802.6 device (e.g., Metropolitan Area Network (MAN)), a Wi-Fi device (e.g., IEEE 802.11ax, a WiMAX device, cellular communication facilities, etc.), and/or the like. The communication unit 608 may permit data to be exchanged with a network and/or any other devices or systems described in the present disclosure.

Modifications, additions, or omissions may be made to the computing system 600 without departing from the scope of the present disclosure. For example, in some embodiments, the computing system 600 may include any number of other components that may not be explicitly illustrated or described. Further, depending on certain implementations, the computing system 600 may not include one or more of the components illustrated and described.

As indicated above, the embodiments described herein may include the use of a computing system (e.g., the processor 602 of FIG. 6) including various computer hardware or software modules. Further, as indicated above, embodiments described herein may be implemented using computer-readable media (e.g., the memory 604 of FIG. 6) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by hardware), specific hardware implementations or a combination of software and specific hardware implementations are also possible and contemplated.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
    obtaining, from a data source, first data comprising a plurality of frames each including a human face;
    automatically detecting, in each of the plurality of frames, one or more facial landmarks and a plurality of action units (AUs) associated with the human face;
    automatically generating a plurality of semantic masks based on the one or more facial landmarks, the plurality of semantic masks individually corresponding to the human face;
    assigning the plurality of AUs to the plurality of semantic masks such that none of the plurality of AUs are assigned to more than one of the plurality of semantic masks and each of the plurality of semantic masks has at least one of the plurality of AUs assigned thereto;
    building a facial hyperspace using the first data, the plurality of AUs, and the plurality of semantic masks, where effects caused by the plurality of AUs are filtered based on the plurality of semantic masks so that effects on AUs that are not associated with the same one of the plurality of semantic masks are reduced as compared to effects on AUs that are associated with the same one of the plurality of semantic masks; and
    generating a synthetic image of the human face using the facial hyperspace and a first frame of the plurality of frames.

2. The method of claim 1, further comprising displaying the synthetic image on a display device, the synthetic image depicting the human face.

3. The method of claim 1, further comprising:
    detecting an AU intensity for each of the plurality of AUs; and
    normalizing the AU intensities based on a minimum intensity value and a maximum intensity value,
    wherein the facial hyperspace is built using the AU intensities.

4. The method of claim 3, wherein the synthetic image of the human face is generated using one or more second AU intensities that are modifications of the detected AU intensities.

5. The method of claim 1, wherein the plurality of AUs are individually assigned to the plurality of semantic masks based on a location of the plurality of AUs relative to a boundary of the plurality of semantic masks.

6. The method of claim 1, wherein the first data is a slow-motion video recording, and the data source is a single video recording device.

7. The method of claim 1, wherein building the facial hyperspace comprises inputting the first data, the plurality of AUs, and the semantic masks into a network architecture.

8. The method of claim 7, wherein the network architecture comprises at least a latent neural network, a coordinate neural network, a hyperspace neural network, and an attribute neural network.

9. The method of claim 7, wherein the network architecture is first trained using the first data, the plurality of AUs, and the semantic masks and the network architecture subsequently generates the synthetic image using the first data.

10. A system comprising:
    one or more computer-readable storage media configured to store instructions; and
    one or more processors communicatively coupled to the one or more computer-readable storage media and configured to, in response to execution of the instructions, cause the system to perform operations, the operations comprising:

obtaining, from a data source, first data comprising a plurality of frames each including a human face;

automatically detecting, in each of the plurality of frames, one or more facial landmarks and a plurality of action units (AUs) associated with the human face;

automatically generating a plurality of semantic masks based on the one or more facial landmarks, the plurality of semantic masks individually corresponding to the human face;

assigning the plurality of AUs to the plurality of semantic masks such that none of the plurality of AUs are assigned to more than one of the plurality of semantic masks and each of the plurality of semantic masks has at least one of the plurality of AUs assigned thereto;

building a facial hyperspace using the first data, the plurality of AUs, and the plurality of semantic masks, where effects caused by the plurality of AUs are filtered based on the plurality of semantic masks so that effects on AUs that are not associated with the same one of the plurality of semantic masks are reduced as compared to effects on AUs that are associated with the same one of the plurality of semantic masks; and generating a synthetic image of the human face using the facial hyperspace and a first frame of the plurality of frames.

11. The system of claim 10, further comprising displaying the synthetic image on a display device, the synthetic image depicting the human face.

12. The system of claim 10, further comprising:
detecting an AU intensity for each of the plurality of AUs; and
normalizing the AU intensities based on a minimum intensity value and a maximum intensity value,
wherein the facial hyperspace is built using the AU intensities.

13. The system of claim 12, wherein the synthetic image of the human face is generated using one or more second AU intensities that are modifications of the detected AU intensities.

14. The system of claim 10, wherein the plurality of AUs are individually assigned to the plurality of semantic masks based on a location of the plurality of AUs relative to a boundary of the plurality of semantic masks.

15. The system of claim 10, wherein the first data is a slow-motion video recording, and the data source is a single video recording device.

16. The system of claim 10, wherein building the facial hyperspace comprises inputting the first data, the plurality of AUs, and the semantic masks into a network architecture.

17. The system of claim 16, wherein the network architecture comprises at least a latent neural network, a coordinate neural network, a hyperspace neural network, and an attribute neural network.

18. The system of claim 16, wherein the network architecture is first trained using the first data, the plurality of AUs, and the semantic masks and the network architecture subsequently generates the synthetic image using the first data.

19. A system comprising:
means for obtaining, from a data source, first data comprising a plurality of frames each including a human face;

means for automatically detecting, in each of the plurality of frames, one or more facial landmarks and a plurality of action units (AUs) associated with the human face;

means for automatically generating a plurality of semantic masks based on the one or more facial landmarks, the plurality of semantic masks individually corresponding to the human face;

means for assigning the plurality of AUs to the plurality of semantic masks such that none of the plurality of AUs are assigned to more than one of the plurality of semantic masks and each of the plurality of semantic masks has at least one of the plurality of AUs assigned thereto;

means for building a facial hyperspace using at least the first data, the plurality of AUs, and the plurality of semantic masks, where effects caused by the plurality of AUs are filtered based on the plurality of semantic masks so that effects on AUs that are not associated with the same one of the plurality of semantic masks are reduced as compared to effects on AUs that are associated with the same one of the plurality of semantic masks; and means for generating a synthetic image of the human face using the facial hyperspace and a first frame of the plurality of frames.

20. The system of claim 19, further comprising means for displaying the synthetic image on a display device, such that the synthetic image may be representative of the human face.

* * * * *